UNITED STATES PATENT OFFICE.

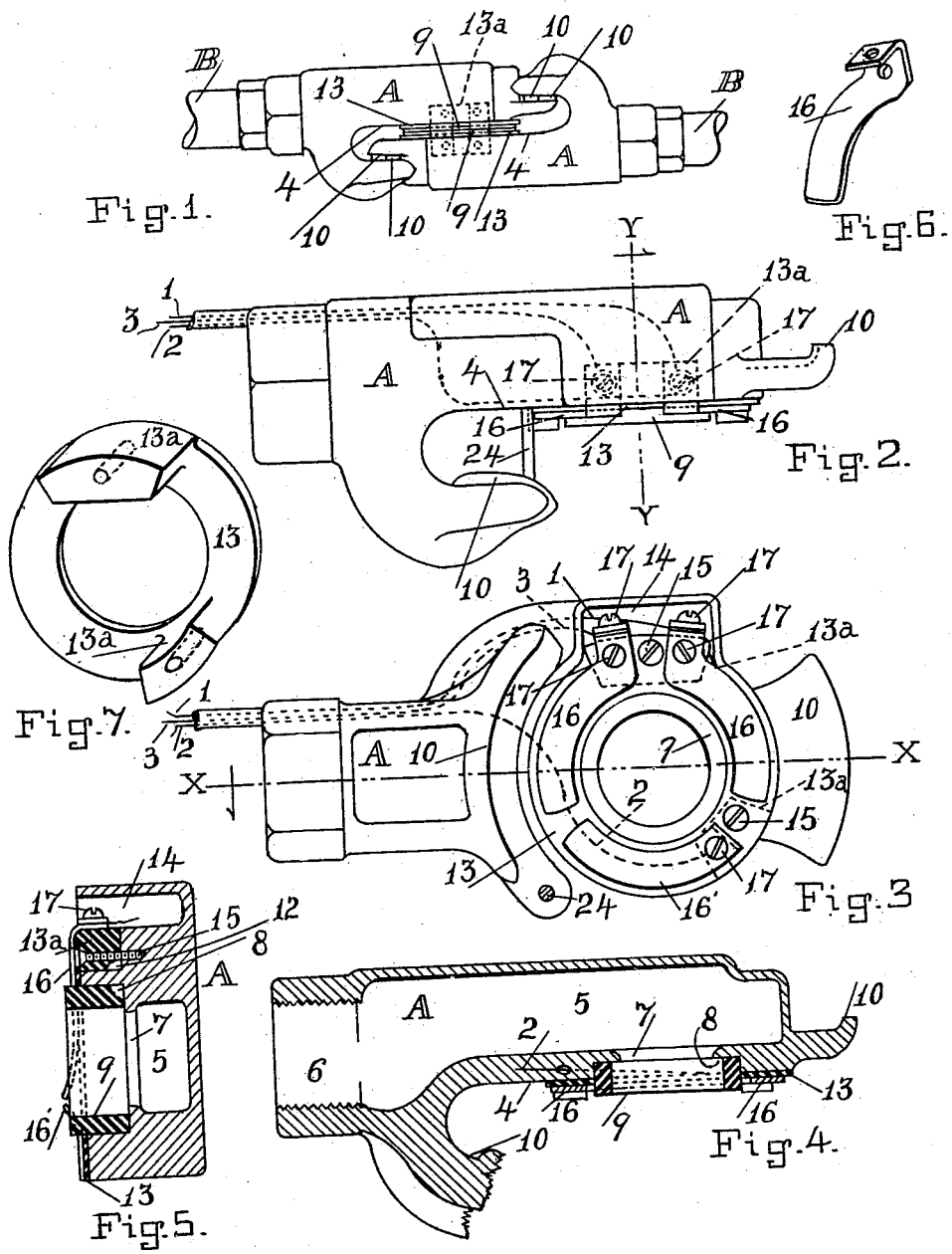

JAMES W. COFFMAN, OF SPRINGFIELD, ILLINOIS.

COUPLING.

1,109,737.  Specification of Letters Patent.  Patented Sept. 8, 1914.

Application filed March 24, 1913. Serial No. 756,466.

*To all whom it may concern:*

Be it known that I, JAMES W. COFFMAN, a citizen of the United States, residing at Springfield, in the county of Sangamon and State of Illinois, have invented a new and useful Improvement in Couplers, of which the following is such a full, clear, and exact description as will enable others skilled in the art to make and use my said invention.

This invention relates to couplers effective for connecting and disconnecting the air system of a railway train and also effective for connecting and disconnecting the electrical system of the same train, simultaneously with the connecting or disconnecting of the air system.

A more specific purpose of the invention is to provide means connected with the flexible hose of the main pipe line of the air brake equipment of the train, so constructed and arranged that the act of coupling the hose will cause complete and effective contact of the electrical connections of the electrical equipment and will also cause air tight connection of the hose.

With these ends in view my invention consists in the novel features of construction and combinations of parts shown in the annexed drawings and hereinafter described and finally recited in the claim.

Figure 1 is a top plan of the coupler. Fig. 2 is an enlarged top plan of one coupling head. Fig. 3 is an enlarged side elevation of one coupling head. Fig. 4 is a horizontal section on the line X. X. of Fig. 3. Fig. 5 is a vertical section on the line Y. Y. of Fig. 2. Fig. 6 is an isometric view of one contact plate and Fig. 7 is an isometric view of one insulating ring.

Similar reference characters designate like parts in the different views.

Each coupler comprises a pair of coupling heads A respectively connected with the hose B of the main pipe line of the air-brake system of the train and interlocking and electrically connected with each other, as will hereinafter more fully appear. The coupler is effective to connect the wires of the electric lighting system of the train and is also effective to connect the wires of the electric signal system of the train. The wiring system of the light and signal circuits preferably comprises wires 1, 2 and 3. The wire 2 is the return wire common to both circuits. The lamps (not shown) are in the circuit 1. 2.; and the signal bells (not shown) are in the circuit 3. 2.

The coupling heads are in pairs which interlock as shown in Fig. 1. The coupling heads and appurtenances are both alike, so a description of one will suffice for both. Each coupling head A, is a casting of substantially the form shown and has a flat inner face 4, and air-chamber 5, an opening 6, communicating with the hose B, an opening 7 in line with a corresponding opening of the complemental coupling head, a circular recess 8 accommodating a rubber ring 9, two arcuate cams or wedges 10 adapted to engage with corresponding cams or wedges on the complemental coupling head, depressions 12, accommodating the blocks 13ª of the insulating rings 13 and a chamber 14 within which the distribution wires and the devices connecting the contact plates with the insulation and the wires are housed and protected from tampering. The insulating rings 13 are of hard rubber or indurated fiber. Each insulating ring has two integral reinforcing blocks 13ª fitting in the depressions 12 of the heads A and connected with the heads by screws 15. One reinforcing block on each insulating ring is single-width, adapted to support and insulate one contact spring, and the other block of the same insulating ring is double-width, adapted to support and insulate two contact springs. The reinforcing blocks on the insulating rings admit of the use of relatively thin insulating rings and the blocks strengthen the rings, prevent the rings from rotating on the heads and afford stable connections of the rings with the heads and stable insulating supports for the contact springs.

Two segmental contact plates 16 and a third segmental contact plate 16′ of hard copper or other springy conducting metal are connected with the blocks 13ª of each insulating ring by screws 17. The free ends of the plates 16 when not depressed project somewhat beyond the outer faces of the rubber packing rings 9 and when a pair of heads A are connected as shown in Fig. 1, the contact plates will be compressed in contact with each other and the faces of the rings 9 will be in air-tight contact with each other, so that compressed air conducted by the main pipe may pass through the heads without leakage.

In order to connect a pair of coupling heads as shown in Fig. 1; the two coupling heads will be disposed with their inner faces 4 adjacent and parallel and with the longitudinal axis of one coupling head approximately at right angles to the longitudinal axis of the other, and one of the coupling heads will be rotated on the transverse axis common to both coupling heads until the longitudinal axes of both coupling heads are parallel in one plane. This rotation of the coupling-head will be limited by the transverse pins 24 and will cause the cams 10 on one coupling head to engage with the corresponding cams 10 on the other coupling head to draw the coupling-heads toward each other, thereby effecting air-tight contact of the packing rings 9 and close contact of the surfaces of the contact plates 16 and 16'. In the electric light circuit current from the generator (not shown), will traverse the line wire 1, the contact plates 16, the lamps, (not shown), the contact plates 16', and the common return wire 2, back to the generator. In the electric signal circuit, current from the generator will traverse the wire 3, the contact plates 16, the signal bells (not shown), the contact plates 16' and the common return wire 2 back to the generator.
Having fully described my invention what I claim as new and desire to secure by Letters Patent is:

The combination of two complemental coupling heads, each having a circular depression adapted to accommodate a packing ring, two radial depressions, one adapted to accommodate a single-width block and the other adapted to accommodate a double-width block and co-acting cams effective upon the rotation of one head relative to the other on a transverse axis common to both heads, to draw the heads together; compressible complemental packing rings fitted in the circular depressions of said heads respectively; insulating rings each having a double-width reinforcing block and a single-width reinforcing block adapted to fit in the respective radial depressions in said heads to afford stable connections of the insulating rings with the heads and stable connections of contact springs with the rings; screws extending through the reinforcing blocks and connecting the insulating rings with the heads respectively; two complemental pairs of arcuate contact-springs, one pair being mounted on the double-width reinforcing block of one insulating ring and the other pair being mounted on the double-width reinforcing block of the other insulating ring; a third pair of arcuate contact-springs, one spring of the pair being mounted on the single width reinforcing block of one insulating ring and the other spring of the pair being mounted on the single width reinforcing block of the other insulating ring; outgoing conductors electrically connected with the complemental pairs of contact springs mounted on the double-width reinforcing blocks; and a common-return conductor electrically connected with the pair of contact springs mounted on the single-width reinforcing blocks.

In witness whereof I have hereunto signed my name at Springfield Illinois this 20th day of March 1913.

JAMES W. COFFMAN.

Witnesses:
 R. W. TROXELL,
 S. ALLYNN TROXELL.

Copies of this patent may be obtained for five cents each, by addressing the "Commissioner of Patents, Washington, D. C."